United States Patent
Rangarajan et al.

(10) Patent No.: US 9,442,850 B1
(45) Date of Patent: Sep. 13, 2016

(54) EFFICIENT DIRECTORY REFRESH OPERATIONS IN WIDE AREA FILE SYSTEMS

(75) Inventors: Murali Rangarajan, South Plainfield, NJ (US); Nikhil R. Doshi, Monmouth Junction, NJ (US); Shirish H. Phatak, Somerset, NJ (US); Suresh Gopalakrishnan, East Windsor, NJ (US); Vaishnav Kumar Kovvuri, Edison, NJ (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1194 days.

(21) Appl. No.: 12/055,261

(22) Filed: Mar. 25, 2008

(51) Int. Cl.
  *G06F 12/08* (2016.01)
  *H04L 29/08* (2006.01)

(52) U.S. Cl.
  CPC ....... *G06F 12/0808* (2013.01); *G06F 12/0804* (2013.01); *H04L 67/2842* (2013.01); *G06F 12/0811* (2013.01); *G06F 12/0824* (2013.01); *H04L 67/2847* (2013.01)

(58) Field of Classification Search
  None
  See application file for complete search history.

(56) References Cited

U.S. PATENT DOCUMENTS

| | | | |
|---|---|---|---|
| 5,452,447 A | 9/1995 | Nelson et al. | |
| 5,594,863 A | 1/1997 | Stiles | |
| 5,611,049 A | 3/1997 | Pitts | |
| 5,634,122 A | 5/1997 | Loucks et al. | |
| 5,689,706 A | 11/1997 | Rao et al. | |
| 5,706,435 A | 1/1998 | Barbara et al. | |
| 5,717,897 A | 2/1998 | McCrory | |
| 5,740,370 A | 4/1998 | Battersby et al. | |
| 5,805,809 A | 9/1998 | Singh et al. | |
| 5,864,837 A | 1/1999 | Maimone | |
| 5,878,218 A | 3/1999 | Maddalozzo et al. | |
| 5,881,229 A * | 3/1999 | Singh et al. | 709/203 |
| 6,012,085 A | 1/2000 | Yohe et al. | |
| 6,049,874 A | 4/2000 | McClain et al. | |
| 6,119,151 A | 9/2000 | Cantrell et al. | |
| 6,122,629 A | 9/2000 | Walker et al. | |
| 6,128,627 A * | 10/2000 | Mattis et al. | |
| 6,243,760 B1 | 6/2001 | Armbruster et al. | |
| 6,366,952 B2 | 4/2002 | Pitts | |
| 6,397,307 B2 | 5/2002 | Ohran | |
| 6,453,404 B1 | 9/2002 | Bereznyi et al. | |
| 6,505,241 B2 | 1/2003 | Pitts | |

(Continued)

OTHER PUBLICATIONS

Carey, M.J., M.J. Franklin, M. Livny and E.J. Shekita, "Data Caching Tradeoffs in Client-Server DBMS Architectures", Proceedings of the 1991 ACM SIGMOD International Conference on Management of Data, Feb. 1991, pp. 357-366.

(Continued)

*Primary Examiner* — Bunjob Jaroenchonwanit
(74) *Attorney, Agent, or Firm* — Baker Botts L.L.P.

(57) ABSTRACT

Methods, apparatuses, and systems directed to reducing network traffic and processing overhead associated with directory refresh operations in wide area network file systems. In a particular implementation, the frequency of synchronization of certain directory contents information, such as security attribute information, that changes less frequently is reduced relative to other types of directory contents information that changes more frequently, such as file and folder names, last modified times, and the like. Other implementations reduce garbage collection overhead for a cached file system by deferring deletion of invalidated objects in a directory until a client application specifically identified the directory.

13 Claims, 9 Drawing Sheets

(56) References Cited

U.S. PATENT DOCUMENTS

| | | | |
|---|---|---|---|
| 6,587,921 B2 | 7/2003 | Chiu et al. | |
| 6,597,956 B1 | 7/2003 | Aziz et al. | |
| 6,609,183 B2 | 8/2003 | Ohran | |
| 6,687,816 B1* | 2/2004 | Frayman et al. | 713/1 |
| 6,721,856 B1* | 4/2004 | Arimilli et al. | 711/146 |
| 6,813,633 B2* | 11/2004 | Wong et al. | 709/217 |
| 6,826,523 B1* | 11/2004 | Guy et al. | 703/22 |
| 6,865,594 B1* | 3/2005 | Belissent et al. | 709/206 |
| 6,944,676 B1 | 9/2005 | Armbruster et al. | |
| 7,069,497 B1* | 6/2006 | Desai | 715/205 |
| 7,716,660 B2* | 5/2010 | Mackay | 717/173 |
| 2001/0011300 A1 | 8/2001 | Pitts | |
| 2001/0016896 A1 | 8/2001 | Pitts | |
| 2001/0047482 A1 | 11/2001 | Harris et al. | |
| 2001/0052058 A1 | 12/2001 | Ohran | |
| 2002/0083111 A1 | 6/2002 | Row et al. | |
| 2002/0138698 A1* | 9/2002 | Kalla | 711/130 |
| 2002/0144068 A1 | 10/2002 | Ohran | |
| 2003/0084104 A1* | 5/2003 | Salem et al. | 709/205 |
| 2004/0068523 A1* | 4/2004 | Keith et al. | 707/200 |
| 2004/0123048 A1* | 6/2004 | Mullins et al. | 711/141 |
| 2004/0139158 A1* | 7/2004 | Datta | 709/205 |
| 2004/0260768 A1 | 12/2004 | Mizuno | |
| 2005/0015461 A1* | 1/2005 | Richard et al. | 709/217 |
| 2005/0060316 A1* | 3/2005 | Kamath et al. | 707/9 |
| 2005/0114604 A1* | 5/2005 | Artobello et al. | 711/130 |
| 2005/0154915 A1* | 7/2005 | Peterson et al. | 713/201 |
| 2007/0143672 A1* | 6/2007 | Lipton et al. | 715/530 |
| 2007/0179989 A1* | 8/2007 | Maes | 707/201 |
| 2007/0233851 A1* | 10/2007 | Ma | 709/224 |
| 2007/0260717 A1 | 11/2007 | Kano | |
| 2007/0263070 A1* | 11/2007 | Harris | 348/14.02 |
| 2007/0271310 A1* | 11/2007 | Han et al. | 707/201 |
| 2008/0209040 A1* | 8/2008 | Rathi | 709/226 |
| 2008/0291765 A1* | 11/2008 | Smith | 365/222 |
| 2008/0294745 A1* | 11/2008 | Lowery et al. | 709/214 |
| 2009/0055727 A1* | 2/2009 | Hansen et al. | 715/234 |
| 2009/0083404 A1* | 3/2009 | Lenzmeier et al. | 709/221 |
| 2009/0112915 A1* | 4/2009 | Lele et al. | 707/102 |
| 2009/0193107 A1* | 7/2009 | Srinivasan et al. | 709/223 |

OTHER PUBLICATIONS

Cox, A.L. and R.J. Fowler, "Adaptive Cache Coherency for Detecting Migratory Shared Data", Proceedings of the 20$^{th}$ Annual International Symposium on Computer Architecture, 1993, pp. 98-108.

Cortes, T., S. Girona and J. Labarta, "Avoiding the Cache Coherence Problem in a Parallel/Distributed File System," Proceedings of the High-Performance Computing and Networking Conference, Apr. 1997, pp. 860-869.

Cortes, T., S. Girona and J. Labarta, "Design Issues of a Cooperative Cache with no Coherence Problems," Proceedings of the 5$^{th}$ Workshop on I/O in Parallel and Distributed Systems, Nov. 17, 1997, pp. 37-46.

Wang, J. "A Survey of Web Caching Schemes for the Internet", ACM SIGCOMM Computer Communication Review, vol. 29, No. 5, Oct. 1999, pp. 36-46.

Wu, K-L and P.S. Yu, "Local Replication for Proxy Web Caches with Hash Routing," Proceedings of the CIKM '99, Nov. 1999, pp. 69-76.

Luo, Q., et al., "Middle-Tier Database Caching for e-Business," Proceedings of the 2002 ACM SIGMOD Conference, Jun. 4-6, 2002, pp. 600-611.

Gray, C.G. and D.R. Cheriton, "Leases: An Efficient Fault-Tolerant Mechanism for Distributed File Cache Consistency", Proceedings of the 12$^{th}$ ACM Symposium on Operating Systems Principles, pp. 202-210, Nov. 1989.

Satyanarayanan, M., et al., "Coda File System User and System Administrators Manual", Carnegie Mellon University, Aug. 1997.

Braam, P.J. and P.A. Nelson, "Removing Bottlenecks in Distributed Filesystems: Coda and InterMezzo as Examples", Proceeding of the Linux Expo 1999, May 1999.

Braam, P.J., M. Callahan and P. Schwan, "The InterMezzo File System", Proceedings of the Perl Conference 3, O'Reilly Open Source Convention, Aug. 1999.

Phatak, S.H., and B.R. Badrinath, "Data Partitioning for Disconnected Client Server Databases", Proceedings of the 1$^{st}$ ACM International Workshop on Data Engineering and Wireless Mobile Access, pp. 102-109, 1999.

Tierney B.L., et al., "A Network-Aware Distributed Storage Cache for Data Intensive Environments", Proceedings of the 8$^{th}$ IEEE International Symposium on High Performance Distributed Computing, pp. 185-193, 1999.

Braam, P.J., "InterMezzo: File Synchronization with InterSync", Carnegie Mellon University, Mar. 20, 2002.

Tacit Networks, Inc. ("Tacit Networks Delivers LAN-Speed Access to Data over WANs") press release, Dec. 9, 2002.

Satyanarayanan, M., "Coda: A Highly Available File System for a Distributed Workstation Environment (#13)", Proceedings of the Second IEEE Workshop on Workstation Operating Systems, Pacific Grove, CA, Sep. 1989.

Braam, P.J. "The Coda Distributed File System (#74)", Linux Journal, No. 50, Jun. 1998.

Tridgell, Andrew, "Efficient Algorithms for Sorting and Synchronization", A thesis submitted for the degree of Doctor of Philosophy at the Australian National University, Feb. 1999.

Dorairajan, Vinodh, "Enabling File Sharing Over the WAN", CommsDesign, May 24, 2004.

* cited by examiner

EFFICIENT DIRECTORY REFRESH OPERATIONS IN WIDE AREA FILE SYSTEMS

TECHNICAL FIELD

The present disclosure relates to wide area network file systems and file caching over distributed networks.

BACKGROUND

While workers can easily share gigabytes of project data on a local-area network (LAN) using standard file-server technology, such is not the case with workers in remote offices connected over wide-area networks (WANs). With respect to file sharing over WANs, standard file server protocols provide unacceptably slow response times when opening and writing files.

All major file-sharing protocols were designed for LAN environments where clients and servers are located in the same building or campus, including: NFS (Network File System, used for Unix/Linux environments), CIFS (Common Internet File System used for Windows environments), and IPX/SPX (Internetwork Packet Exchange/Sequenced Packet Exchange, used for Novell environments). The assumption that the client and the server would be in close proximity led to a number of design decisions that do not scale across WANs. For example, these file sharing protocols tend to be rather "chatty", insofar as they send many remote procedure calls (RPCs) across the network to perform operations.

For certain operations on a file system using the NFS protocol (such as an rsync of a source code tree), almost 80% of the RPCs sent across the network can be access RPCs, while the actual read and write RPCs typically comprise only 8-10% of the RPCs. Thus 80% of the work done by the protocol is simply spent trying to determine if the NFS client has the proper permissions to access a particular file on the NFS server, rather than actually moving data. In a LAN environment, these RPCs do not degrade performance significantly given the usual abundance of bandwidth, but they do in WANs, because of their high latency. Furthermore, because data movement RPCs make up such a small percentage of the communications, increasing network bandwidth will not help to alleviate the performance problem in WANs.

Therefore, systems have been developed (called wide area file services (WAFS)) which combine distributed file systems with caching technology to allow real-time, read-write access to shared file storage from any location, including locations connected across WANs, while also providing interoperability with standard file sharing protocols such as NFS and CIFS.

WAFS systems typically include edge file gateway (EFG) appliances (or servers), which are placed at multiple remote offices, and one or more file server appliances, at a central office or remote data center relative to the EFG appliance, that allow storage resources to be accessed by the EFG appliances. Each EFG appliance appears as a local fileserver to office users at the respective remote offices. Together, the EFG appliances and file server appliance implement a distributed file system and communicate using a WAN-optimized protocol. This protocol is translated back and forth to NFS and CIFS at either end, to communicate with the user applications and the remote storage.

The WAN-optimized protocol typically may include file-aware differencing technology, data compression, streaming, and other technologies designed to enhance performance and efficiency in moving data across the WAN. File-aware differencing technology detects which parts of a file have changed and only moves those parts across the WAN. Furthermore, if pieces of a file have been rearranged, only offset information will be sent, rather than the data itself.

In WAFS systems, performance during "read" operations is usually governed by the ability of the EFG appliance to cache files and the ability to serve cached data to users while minimizing the overhead of expensive kernel-user communication and context switches, in effect enabling the cache to act just like a high-performance file server. Typically, the cache attempts to mirror the remote data center, so that "read" requests will be satisfied from the local cache with only a few WAN round trips required to check credentials and availability of file updates.

File management or explorer applications typically feature a graphical user interface that allows users to view the files and folders available either on a local hard drive or on a network share hosted on a remote file server. File systems are typically arranged in a hierarchy of folders with one or more files stored in the folders. Users can navigate within the folder hierarchy by selecting parent of child folders of the current folder. In WAFS systems, data regarding the folders and files stored within them are synchronized or refreshed between a local cache and a remote file server in order to provide users with a current view. In many WAFS systems, a local cache may request directory updates from remote file server or a cache server operating in connection with the remote file server as a user navigates a file system hierarchy. The directory updates typically entail the objects (files and folders) within a current directory, meta data relating to these objects, and security information, such as access control lists defining which users are permitted to access the files or folders. These update requests may spawn an appreciable amount of network traffic overhead when one considers that WAFS systems typically support a large number of remote users.

SUMMARY

In particular embodiments, the present invention provides methods, apparatuses, and systems directed to reducing network traffic and processing overhead associated with directory refresh operations in wide area network file systems. In a particular implementation, the frequency of synchronization of certain directory contents information, such as security attribute information, that changes less frequently is reduced relative to other types of directory contents information that changes more frequently, such as file and folder names, last modified times, and the like. Other implementations reduce garbage collection overhead for a cached file system by deferring deletion of invalidated objects in a directory until a client application specifically identified the directory. Implementations of the present invention can be configured to improve the performance of wide area network file systems, while preserving file consistency.

DESCRIPTION OF THE DRAWINGS

Example embodiments are illustrated in referenced figures of the drawings. It is intended that the embodiments and figures disclosed herein are to be considered illustrative rather than limiting.

DESCRIPTION OF EXAMPLE EMBODIMENT(S)

The following example embodiments are described and illustrated in conjunction with apparatuses, methods, and systems which are meant to be examples and illustrative, not limiting in scope. As will be apparent from the description below, embodiments of the present invention facilitate shared access to files in a distributed file caching system, such as a wide area network file system, by reducing processing requirements and network traffic associated with directory refreshes.

A. Network Environment

Figure 1A:
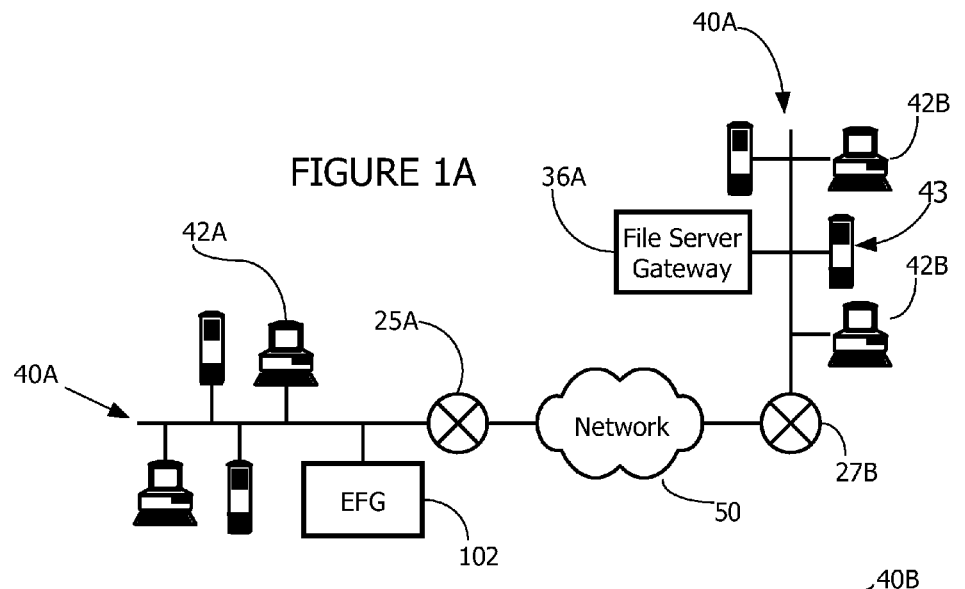
FIGS. 1A-1B are high-level block diagrams illustrating example computer network environments in which embodiments of the present invention might operate.
Figure 1B:
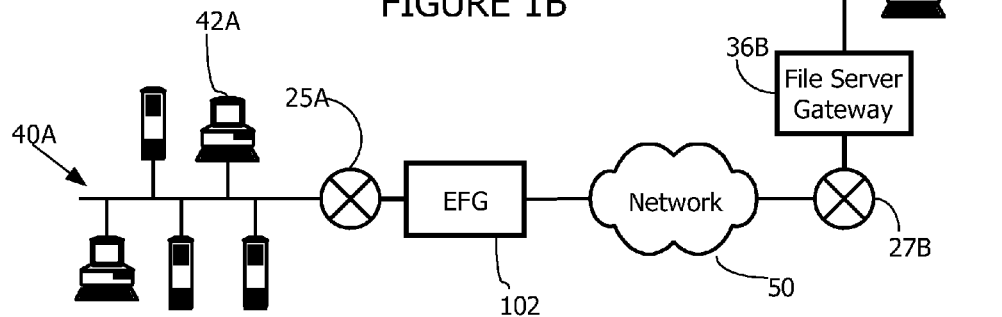

As discussed in the background above, WAFS systems often include one or more EFG appliances 102 (or servers) and one or more remote file server appliances 36 (or servers), typically at a different location, that allow storage resources to be accessed by the EFG appliances 102 on behalf of workstations 42A. FIGS. 1A-1B show at a high level such an arrangement, which might be used with an embodiment of the present invention. In particular, FIGS. 1A-1B show a network 50 connecting a remote file server appliance 36 to EFG appliance 102. In turn, the remote file server appliance 36 is connected, via a LAN (40A, 40B) or other network, to a file server 43 and the EFG appliances 102 are connected, again via a LAN 40A or other network, to workstations 42A. It can be appreciated that EFG appliances 102 may also be remote file server appliances with respect to data stored on resources operably connected to the same LAN or subnet.

In the embodiment of FIG. 1A, a router 25A is interposed between the LAN 40A and the network 50 which is in turn connected to router 27B and LAN 40B. In the embodiment of FIG. 1B, EFG appliance 102 is interposed between router 27B and the network 50. In a similar fashion, router 27B is deployed between the network 50 and the file server appliance 36B.

Figure 2:
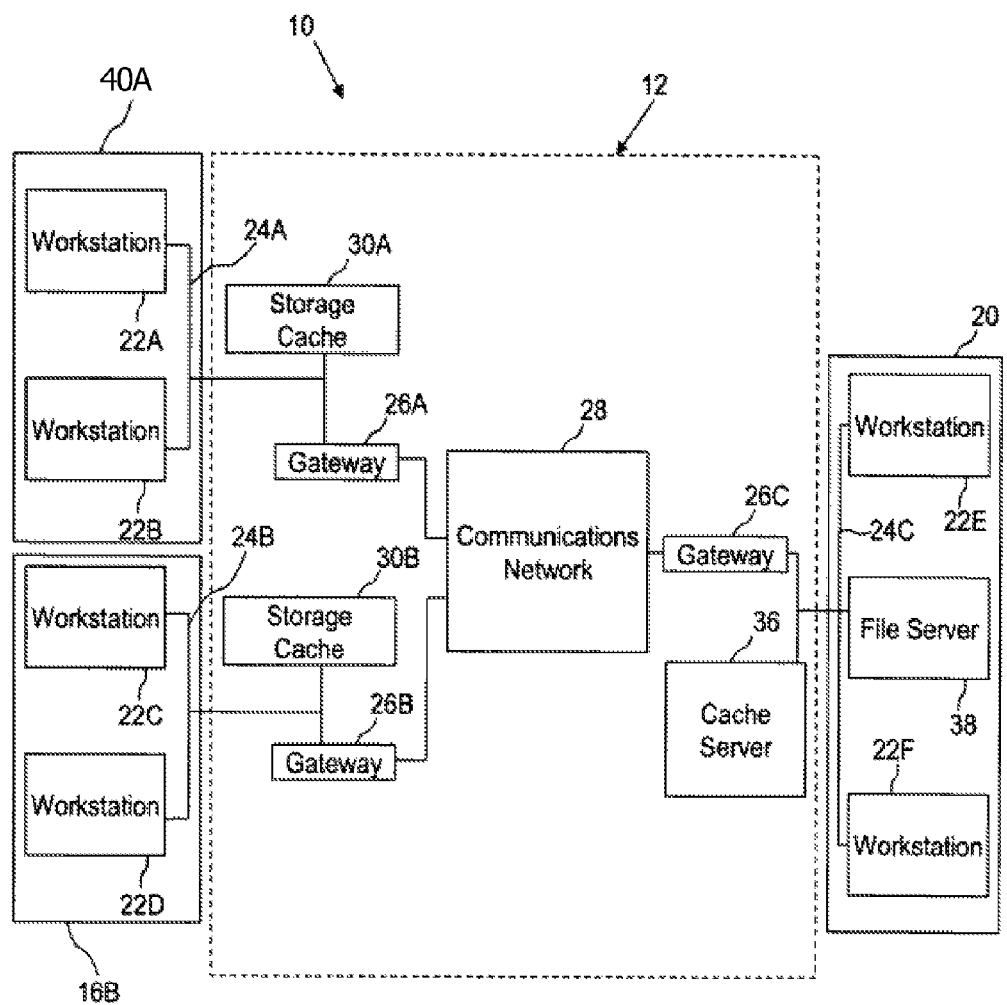
FIG. 2 is a lower-level block diagram illustrating an example computer network environment in which embodiments of the present invention might operate.

FIG. 2 is a block diagram showing, at a lower level, an example computer network environment in which embodiments of the present invention might operate. The network environment 10 includes a storage-caching protocol system 12 that interfaces with a distributed file system application operating at a data center computer system, which is a repository for data files, and a computer system which is associated with a computer workstation that desires to access, i.e., view only (read) or modify (write), data files stored at a file server of a data center system. The data center system is typically at a remote location relative to the computer system. The storage-caching protocol system 12 includes at least one EFG appliance 30A, 30B (here referred to as a "storage cache"), which is coupled to a workstation of an associated remote system, and at least one remote file server appliance 36 (here referred to as a "cache server"), which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

Storage caching protocol system 12 in the illustrative network 10 shown in FIG. 2, the system 12 interfaces with work group computer systems 16A and 16B and a central work group data center computer system 20. The system 16A includes computer workstations 22A and 22B interconnected over a communications channel 24A, such as an Ethernet or like medium. Similarly, the system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a system, in combination with the Ethernet, form a LAN and operate in accordance with a conventional distributed file system, such as NFS or CIFS, which provides that a user of a workstation can access data files located remotely from the system in which the workstation is contained.

A communications gateway 26A, 26B, 26C couples the Ethernet 24 of each of the systems 16 to a communications network 28. The network 28, for example, can be a WAN, LAN, the Internet or any like means for providing data communications links between geographically disparate locations. The gateway 26, for example, may implement a VPN Internet connection with remote gateways. The gateway 26 enables data, such as data files accessible in accordance with a distributed file system such as NFS or CIFS, to be transferred between a workstation and a remotely located file server. Furthermore, the functions of gateway 26 may be physically hosted on the same computing device as the storage cache and cache servers.

Referring again to FIG. 2, the storage caching system 12 includes storage caches (EFG appliances) 30A and 30B which are associated with the systems 16A and 16B, respectively. Each storage cache 30 is coupled to the Ethernet 24 and the gateway 26A, 26B of the associated system 16A, 16B. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22D and 22E contained in the data center system 20. The file server 38 is a file storage device, such as a NAS (Network Attached Storage), which is a repository for data files and provides for distribution of stored data files to authorized workstations in accordance with the operation of distributed file systems, such as NFS or CIFS, which are implemented at the authorized workstations of the systems 16 and the data center 20. For purposes of illustration, it is assumed that all of the workstations 22 in the systems 16 and in the data center 20 constitute authorized workstations and operate in accordance with a distributed file system compatible with that of the server 38.

Figure 3:
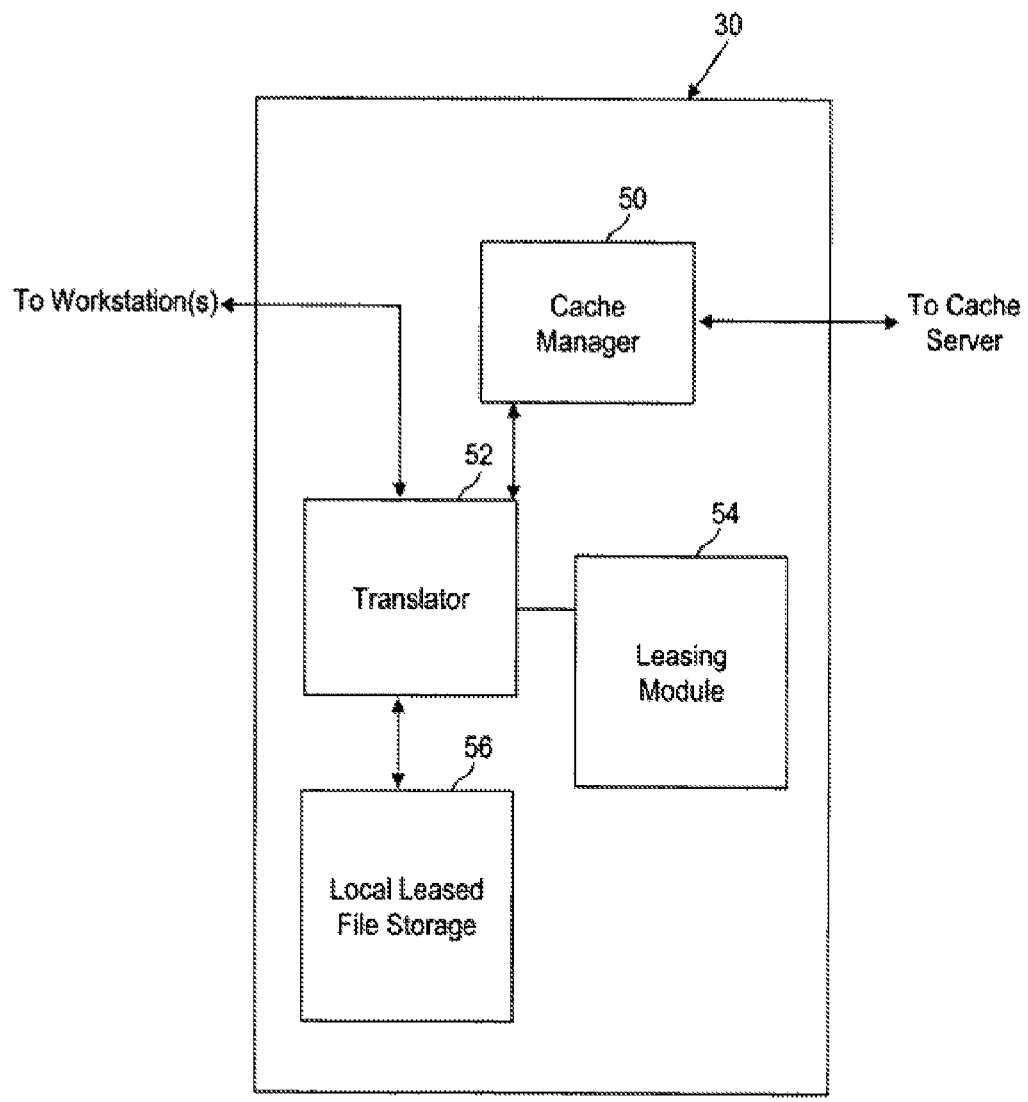
FIG. 3 is a block diagram illustrating the functional components of an EFG appliance (or server), which might be used in some embodiments of the present invention.

FIG. 3 is a block diagram of a storage cache (or EFG appliance), in accordance with the present invention. Referring to FIG. 3, the storage cache 30 includes the modules of a cache manager 50, a translator 52, a leasing module 54, and a local leased file storage 56. The cache manager 50 is coupled to the translator 52 and is coupled to a cache server, such as the cache server 36 as shown in FIG. 2, via gateways and a communications network. The translator 52 is coupled to the leasing module 54 and the local storage 56, and is coupled to workstations of an associated system via an Ethernet connection.

The cache manager 50 controls routing of data files, file update data, and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 can generate a checksum representative of a first data file and determine the difference between another data file and the first data file based on the checksum using techniques that are well known. The leasing module 54, through interactions with the cache server 36, determines whether to grant a request for access to a data file from an associated workstation, where the access request requires that the cached data file is made available to the associated workstation either for read or write purposes. Typically, a storage cache is associated with every remote computer system that can access a data file stored at a file server of a data center system over the network 28.

Figure 4:
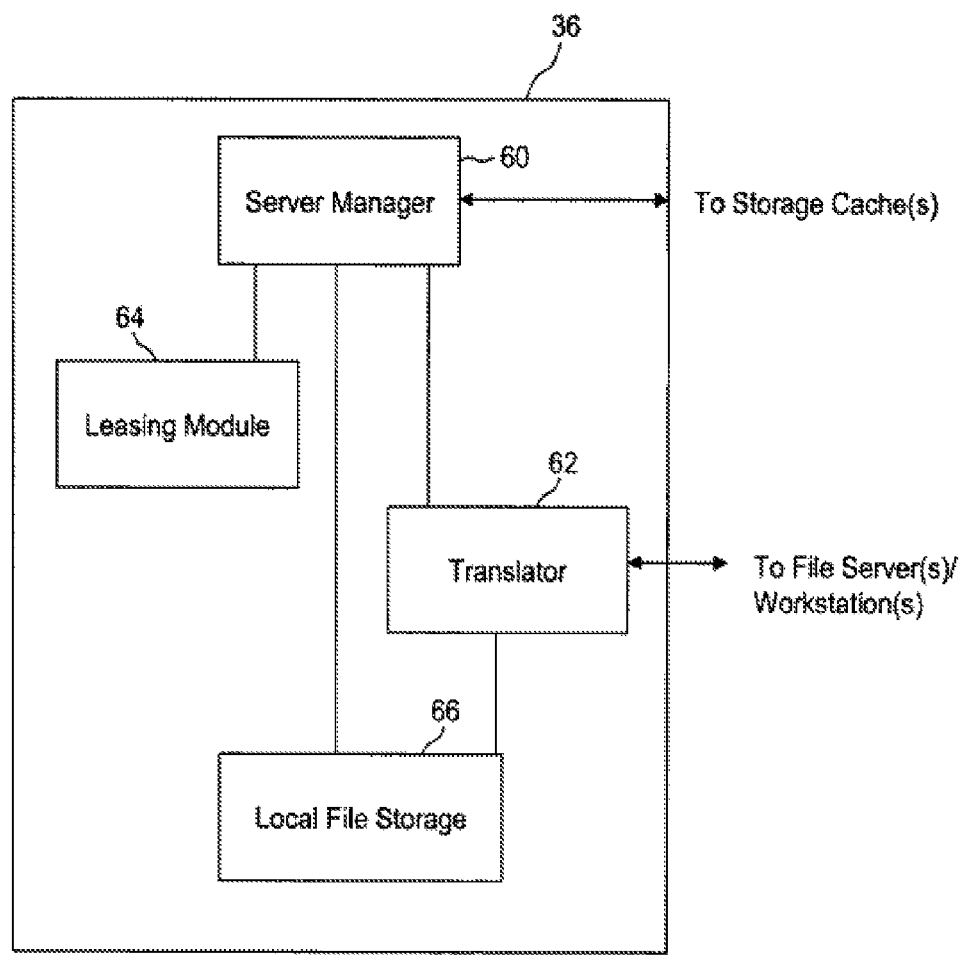
FIG. 4 is a block diagram illustrating the functional components of a CS appliance (or server).

FIG. 4 is a block diagram of the cache server (or CS appliance). The cache server manages shared access to data files stored in the file server by multiple storage caches, such as the caches 30A and 30B, and also by workstations, such as the workstations 22E and 22F of the data center 20, which are not associated with a storage cache. In some implementations, the cache server might be a thin appliance having an architecture that makes it compatible and easily integrated with a distributed file system, such as NAS and SAN (Storage Area Network), implemented at a computer system and a data center computer system.

Referring to FIG. 4, the cache server 36 includes the modules of a server manager 60, a translator 62, a leasing module 64, and a local file storage 66. The server manager 60 is coupled to the translator 62, the leasing module 64 and the storage 66 and also is coupled to storage caches, such as the storage caches 30A and 30B, via the gateway 26C and the network 28. The translator 62 is coupled to the storage 66 and is coupled to a file server of an associated data center computer system via an Ethernet connection. The translator 62 temporarily stores, at the storage 66, copies of data files stored at and obtained from the file server 38, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 38 only for viewing purposes in accordance with the leasing protocol.

The translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage caches 30 and the cache server 36, which perform data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in some embodiments, the modules within each of the cache server 36 and the storage caches 30 can be combined, as suitable, into composite modules, and that the cache server and storage caches can be combined into a single appliance which can provide both caching for a workstation and real time updating of the data files stored at a file server of a central data center computer system.

The storage caches and the cache server, of the storage caching system 12 provide that a data file stored in a file server of a data center, and available for distribution to authorized workstations via a distributed file system, can be accessed for read or write purposes by the workstations, that the workstations experience reduced latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation.

In a connected mode, file update data associated with the cached data file is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In some implementations, the local storage 56 of the storage cache includes only cached data files corresponding to recently accessed data files.

B. System Architecture for EFG Appliance and Cache Server

Figure 5:
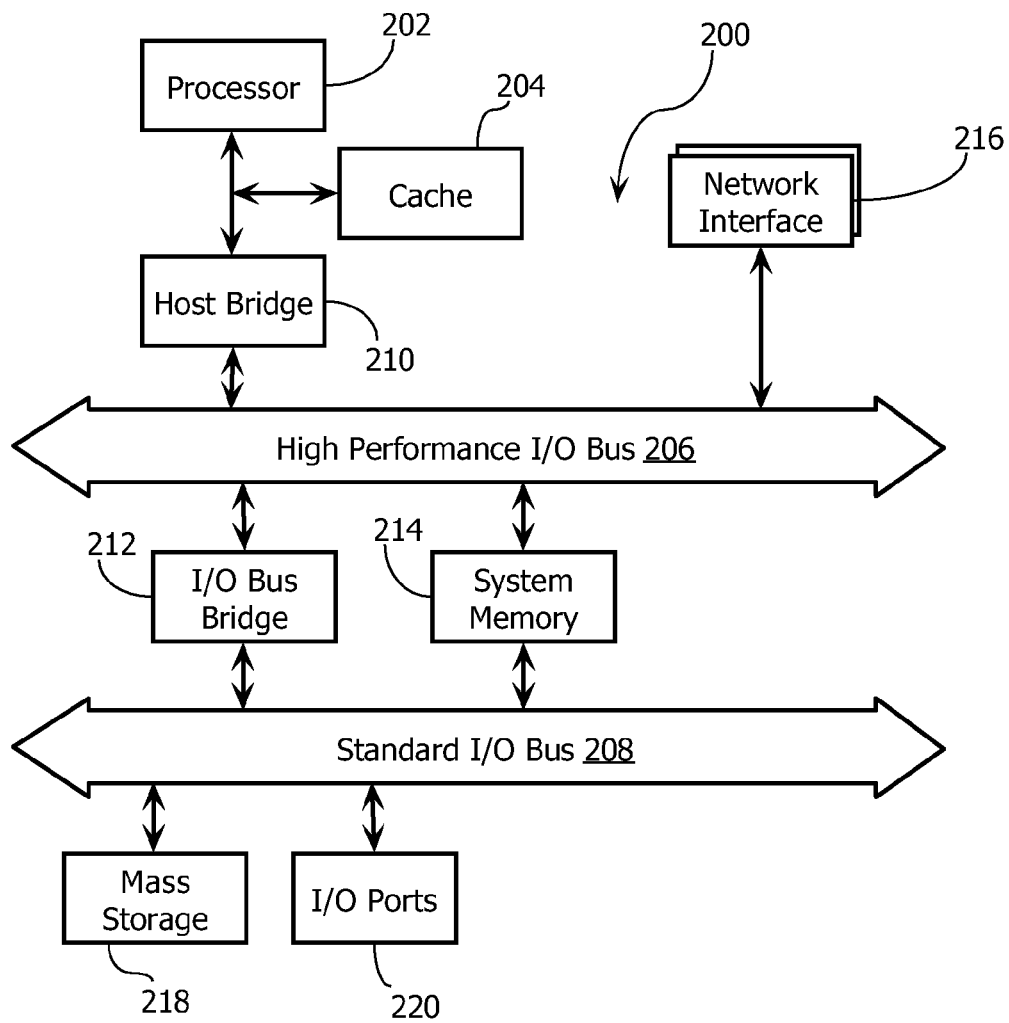
FIG. 5 is a diagram showing a high-level example system architecture that may be used to implement an EFG appliance (or server) or a CS appliance (or server).

FIG. 5 illustrates, for didactic purposes, a hardware system 200, which might be a part of an EFG appliance (or storage cache) or a remote file server appliance (or cache server), in particular embodiments. Typically, an appliance includes an off-the-shelf computer and operating system, but the appliance vendor has designed the computer's box and user interface so that the user cannot access anything on the computer, except for an application interface. Since the underlying computing architecture is locked down and essentially invisible, it becomes difficult to discern that the device really functions on top of general purpose hardware and operating system software. Linux is commonly used as the operating system for such appliances, though other operating systems, such as Windows-based operating systems, are also used. Alternatively, as suggested elsewhere, some embodiments employ an EFG server rather than an EFG appliance and in those embodiments the underlying computer architecture is not locked down. The same is also true of embodiments that employ a CS server, rather than a CS appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® Server 2003 (or other variant) operating system available from Microsoft Corporation of Redmond, Wash. However, the present invention may be used with other suitable operating systems, such as the Windows® 95/98/NT/XP/Vista operating system, available from Microsoft Corporation of Redmond, Wash., the Linux operating system, the Apple Macintosh Operating System, available from Apple Computer Inc. of Cupertino, Calif., UNIX operating systems, and the like.

C. Directory Refresh Operations

Typically, a file management client application, such as Windows® Explorer® distributed in connection with the Windows® operating system offered by Microsoft® Corporation of Redmond, Wash., issues directory contents information requests or commands (e.g., readdir) to a remote file server as the user browses a folder hierarchy. For example, when a user accesses a given folder, the file management application may transmit a "readdir" command identifying the folder (e.g., example), as well as the path to the folder (e.g., server\parent_folder\example). A response to the readdir command may include a list of the files and folders in the current folder and meta data relating to these objects, such as last-modified times, file sizes, and the like. In a WAFS system, the file management client application interacts directly with an EFG 102, which receives the request and responds, in one implementation, by processing the request against its local cache. In some implementations, the readdir command issued by the client application may cause the EFG 102 to refresh the contents of the directory or folder by transmitting a request to the cache server 36 to retrieve the contents of the directory from the remote file server 38.

C.1. Lightweight Directory Refresh

The current Refresh directory mechanism fetches all the objects, attributes and also the security buffers for each object. Based on the number of objects present in the directory and the size of the security buffer associated with each object, a directory refresh operation could involve multiple roundtrips between the EFG 102 and the cache server 36. These round trips, the inherent latencies of the network 50, and other processing on the EFG 102 and the cache server 36 can add significant delay for completion of the operation. It has been observed that the security attributes (typically, ACLs) for files and objects do not change frequently. As a result, cached copies of folder contents need not be aggressively refreshed.

Accordingly, the EFG 102, in a particular implementation, processes requests to refresh directory contents in a manner that reduces the directory information that is refreshed on a more frequent basis. When it sends requests to the core appliance for refreshing the contents of a folder, a special flag is used to indicate to the cache server whether a full refresh (which also covers security attributes) is required. As discussed below, the EFG 102 also maintains a timestamp of the last full refresh and uses this timestamp to determine whether a full refresh is needed. In a particular implementation, a full refresh is requested either on the fourth request or if two minutes has passed after the last full refresh. A refresh of the directory contents on the cache is typically performed if it has been 30 seconds since the last refresh. When new objects are accessed (for which the security attributes have never been refreshed), a full lookup is issued to fetch the metadata including all the security attributes.

Figure 8:
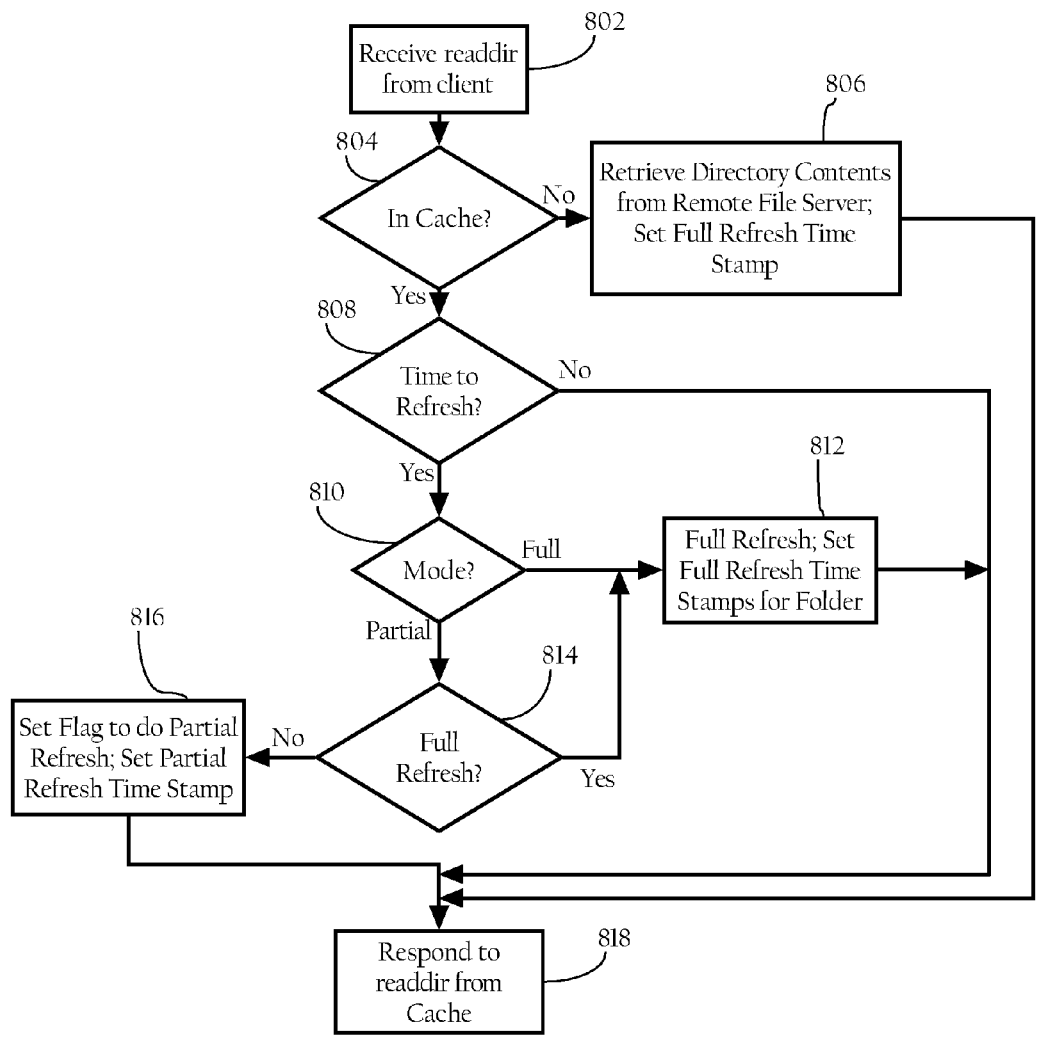

FIG. 8 illustrates a process executed by an EFG 102 in response to a directory contents access command (such as a readdir command in the Network File System (NFS) protocol, or a FindFirst/FindNext or "read directory" command in a Windows file system environment). As FIG. 8 illustrates, when the EFG 102 receives a directory contents access request from a client (802), it determines whether the contents of the directory identified in the command is in the local cache (804). If not, the EFG 102 retrieves the directory contents, including security attributes, from the remote file server 38 via the cache server 36 and sets a full refresh time stamp (806). If a cached version of the directory contents exists (804), the EFG responds to the request from the local cache (818) and, as discussed below, determines whether to refresh the contents of the directory in the cache from the remote file server 38. In the implementation shown, the EFG 102 maintains certain meta data for each directory including a full refresh time stamp and a partial refresh time stamp. In determining whether to refresh the contents of the cached version of the directory (808), the EFG 102 access both the full and partial refresh time stamps to determine the last time a refresh has been performed for the directory. In one implementation, if a refresh (full or partial) has not been performed within a configurable period of time T1 (e.g., T1=30 seconds), the EFG 102 determines whether to do a full or partial refresh. If a refresh has been performed within the last T1 period of time, the EFG omits performing the directory refresh to reduce the amount of traffic and the processing resources consumed for refreshes. As one skilled in the art, the refresh interval T1 can be set based on a variety of performance considerations.

In the implementation shown, the EFG 102 allows a user to configure a refresh mode—full or partial. In the full mode, a full directory refresh, including (for example) security attribute information, is performed at every directory refresh operation. In a partial mode, the EFG 102 performs both full directory refresh operations and partial directory refresh operations. Partial directory refresh operations involve refreshing less directory data than a full directory refresh operation. In one implementation, a partial directory refresh operation omits updating security information, such as access control lists. Accordingly, as shown in FIG. 8, EFG 102 first determines what mode (full or partial) has been configured (810). If the mode configuration indicates a full refresh, the EFG 102 performs a full refresh operation, requesting all directory content information, and sets a full refresh time stamp for the directory (812). Otherwise, if the mode configuration is a partial mode, the EFG determines whether to perform a full or partial refresh operation (814). In a particular implementation, the EFG 102 compares the current time against the full refresh time stamp corresponding to the directory. If a full refresh or the directory has not been performed within a configurable period of time T2 (e.g., T2=120 seconds), the EFG 102 performs a full refresh operation (812). Otherwise, the EFG 102 performs a partial refresh operation and sets a partial refresh time stamp (816).

Figure 9:
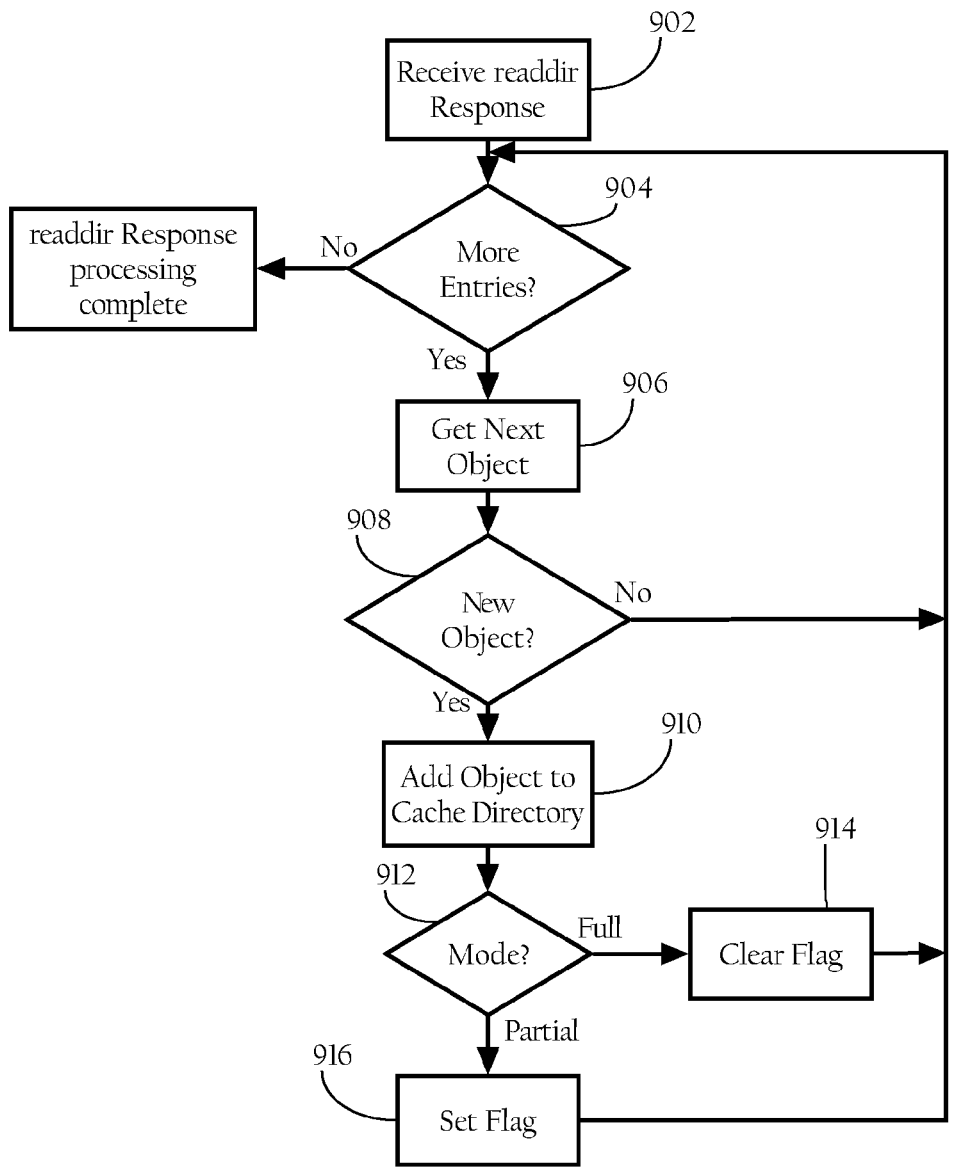

For a directory refresh operation, an EFG 102 requests the object information for an identified directory. Cache server 36 receives the request and interacts directly with the remote file server 38 to obtain and return the object information to the EFG 102. The request transmitted by the EFG 102 can include a reserved bit or flag that indicates whether a full or partial refresh is indicated. FIG. 9 shows a method implemented at an EFG 102 for processing the response that includes directory object information. When the EFG 102 receives the response to the readdir command (902), it processes all objects (e.g., files or folders) in the response (904, 906), adding any new objects identified in the response to the local cache maintained by the EFG 102 (908, 910). In one implementation, the cache server 36 sets a bit or flag that indicates whether the directory object information is responsive to a full or partial request. As FIG. 9 illustrates, EFG 102 sets a security flag (916), if the response indicates a partial refresh mode; otherwise, the EFG 102 clears the security flag (914) for the object entry. In addition, the EFG 102 includes logic to omit synchronization of security or access information during partial refreshes, since no such information is being provided.

The security flag indicates whether the security information (e.g., access control lists) for the object in the cache of the EFG 102 is synchronized with the remote file server 38. As discussed above, the security flag for objects added to the cache during a partial refresh operation will not be cleared. In such instances, the EFG 102, when a client application attempts to open a file or folder, will issue a command to the cache server 36 to synchronize the security information for the object, clear the flag and provide access to the object (assuming authorization) to the client application. If a client application does not attempt to open the file, the security flag will be cleared during the next full directory refresh operation. In this manner, the security flag is set and cleared once in the life time of the cached object. That is, any new objects created in the cache during a partial directory refresh have the security flag set to ensure that no objects are presented to client applications without security attributes.

As one skilled in the art will recognize, the frequency of synchronization of certain directory contents information, such as security attribute information, that changes less frequently is reduced relative to other types of directory contents information that changes more frequently, such as file and folder names, last modified times, and the like. This reduces processing and network bandwidth overhead associated with synchronizing directory contents information.

C.2. One-Pass Directory Synchronization

In certain prior art systems, a synchronization scheme is used on the edge appliance (here, the EFG 102) that marks objects currently in the local cache and compares these to the directory or folder contents received as part of the directory refresh information received from the cache server 36. This disclosure uses directory and folder interchangeably. Furthermore, an object can refer to a file or a folder, in addition, folder can include other objects, such as files and folders. In order to capture objects that have been added or deleted on the file server 38 since the previous refresh, a two-pass approach is implemented in which objects received from the file server are flagged with a special value (in the first pass) and created on the cache. A second pass is performed by means of local I/O on the objects currently in the cache to eliminate any objects that are not specially flagged. This allows removal of objects from the cache that were deleted (before the current refresh) at the file server 38. Implementations of the invention achieve the same effect with a delayed two-pass synchronization mechanism that reduces network and processing overhead associated with synchronizing directory content information at the EFG 102.

Figure 6:
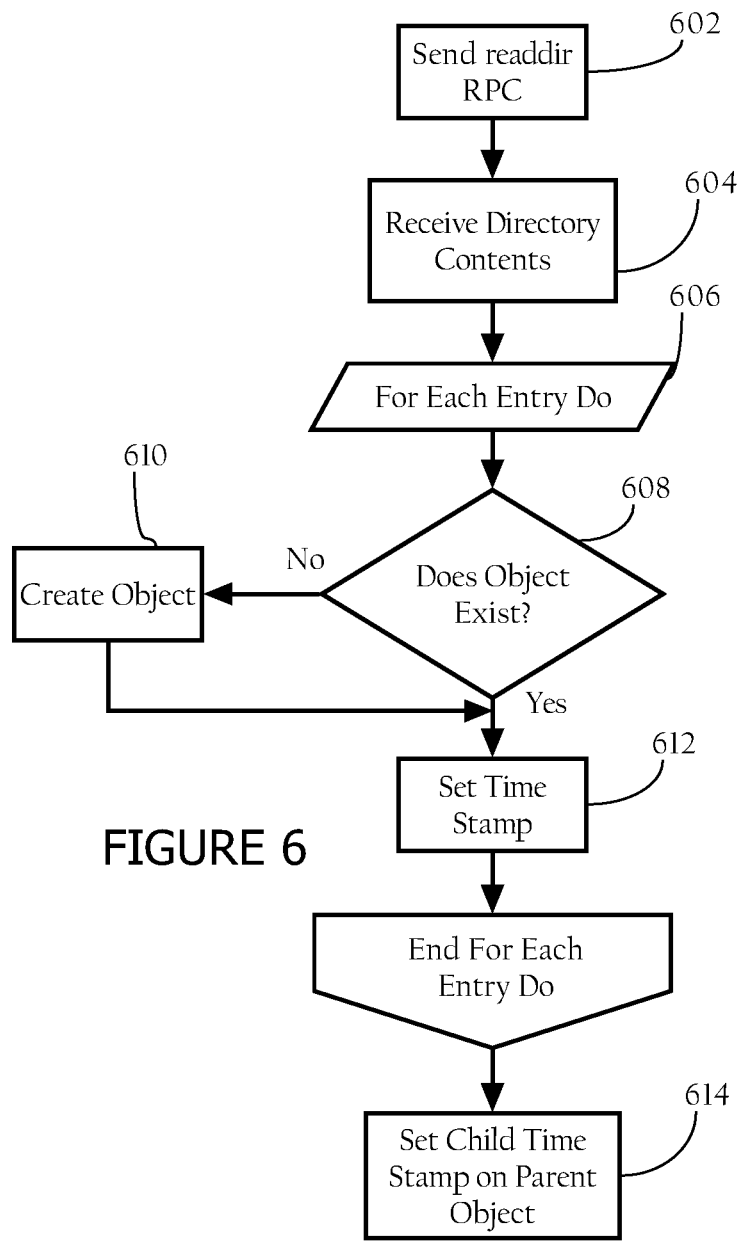
FIGS. 6 to 9 are flow chart diagrams illustrating methods directed to enhancing operation of directory input/output operations in a wide area network file system.
Figure 7:
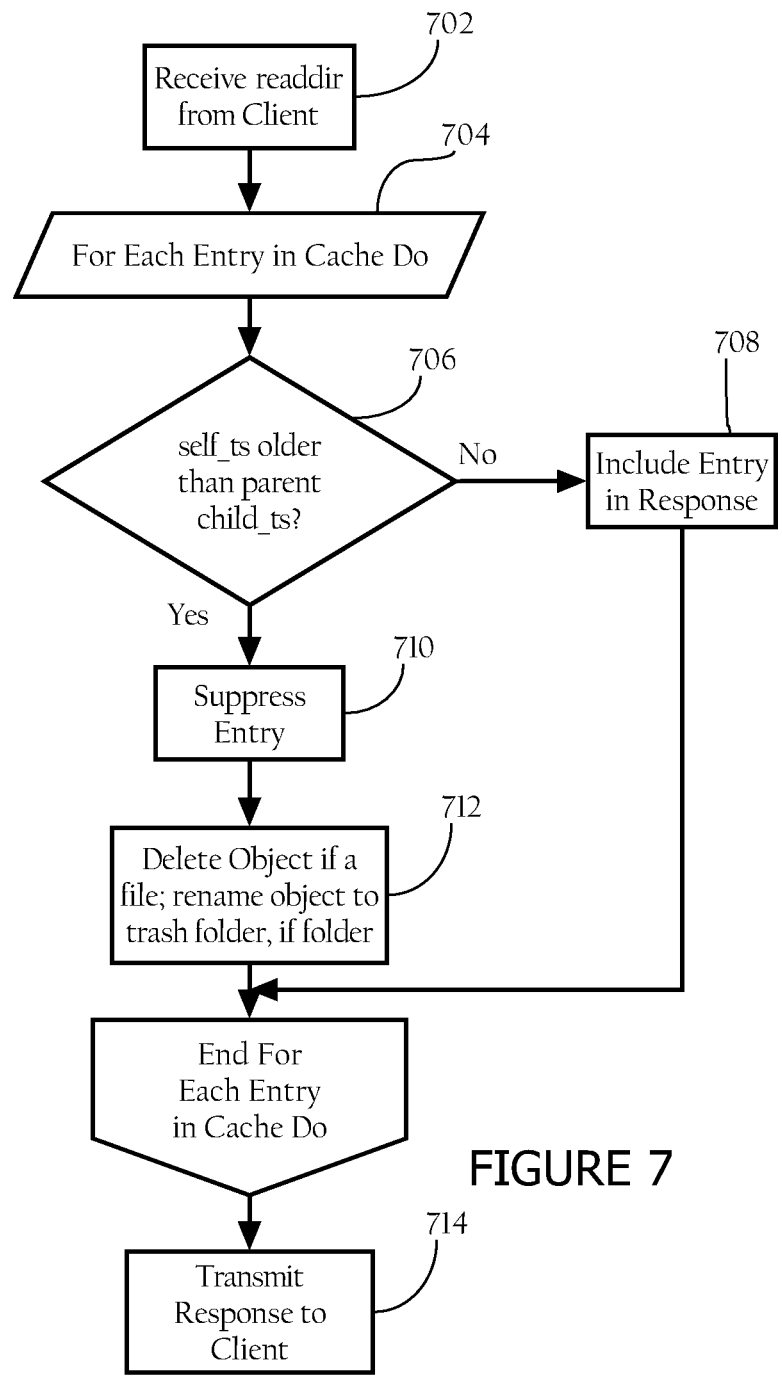

More specifically, the EFG 102 implements a delayed two-pass directory synchronization scheme. In a first pass, the EFG receives updated directory content information from a remote file server, adding any newly identified objects and setting time stamps on all objects. The second pass involves deleting old objects from the directory. This second pass, however, is delayed until a request to access the contents of the directory is received from a client application. FIGS. 6 and 7 illustrate two processes associated with this delayed, two-pass directory synchronization scheme.

FIG. 6 illustrates a process, according to one implementation of the invention, executed by an EFG 102. As discussed above, an EFG 102 may transmit a "readdir" remote procedure call (RPC) or other directory contents information access request to the cache server 36 in response to a request from a client application (602). As discussed above, the EFG 102 may transmit this request to refresh its cache at most every T1 seconds. The EFG 102, however, responds to the client application request from its local cache. When the directory contents are received from the cache server 36 (604), the EFG performs a one-pass synchronization, scanning all objects in the directory. In the implementation shown, the EFG 102, for each entry identified in the response (606), creates all new objects that do not already exist in the cache maintained by the EFG 102 (608, 610). For all objects in the instant directory, the EFG 102 also sets a current time stamp (612). The time stamp can be an explicit time value (e.g., hh:mm:ss, etc.) or a counter value returned from a clock or counter source. In addition, the EFG also sets a current child time stamp corresponding to the instant directory (614). As discussed below, this child time stamp can be compared against the time stamps of the object in the directory to determine whether to delete a given object in the cache version of the directory.

FIG. 7 illustrates a process, according to one implementation of the invention, executed by an EFG 102 in response to a directory information access request issued by a client application. In the implementation shown, the EFG 102, responsive to a directory information access request issued by a client application (702), compares, for each object entry in the local cache (704), the time stamp of the object (self_ts) to the child time stamp of the directory (child_ts) identified in the request (706). If the time stamp of an object is older than the child time stamp of the directory, this indicates that the object was deleted on the remote file server 38 since the time stamp of the object was not updated during the first pass of the synchronization (see FIG. 6 above). Accordingly, the EFG 102 suppresses the stale entry from the response to the request from the client application (710, 714). If the object is a file, the EFG 102 deletes it. If the object is a folder, the EFG 102 renames the object to a trash folder (712).

In connection with this delayed, two-pass synchronization mechanism, if a client application creates a new object, the EFG 102 sets the time stamp of the object to the current time, if the object is a file or folder. If the object is a folder, the EFG 102 also sets the child time stamp of the folder to zero. The EFG 102 also issues commands to the remote cache server 36 to create corresponding objects on the remote file server 36. In addition, for rename operations when an object gets moved from one directory to another, the EFG 102 sets the time stamp of the target object to the child time stamp of the parent folder to prevent the object from being deleted during the process illustrated in FIG. 7.

As the foregoing illustrates, embodiments of the invention improve directory input/output (I/O) performance in wide area network file systems by reducing the network and processing overhead associated with fetching and refreshing directory content information. Certain embodiments of the invention reduce the amount of data transmitted over a wide area network during operation of the WAFS system. Some embodiments can improve the scalability of the cache server 36, allowing it to serve more EFGs 102 and corresponding directory meta data requests. Some embodiments improve directory I/O performance by reducing the processing overhead, and reducing latency, at the EFG 102 during synchronization of directory contents.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. As a result, the invention is not limited to the specific examples and illustrations discussed above, but only by the following claims and their equivalents.

What is claimed is:

1. An apparatus comprising
one or more network interfaces;
a memory;
one or more processors;
computer-readable instructions stored in the memory operable to cause the one or more processors to
maintain, in a local cache, a cached version of directory contents information of a remote file server, the directory contents information including an object time stamp for each file and a child time stamp for each folder, wherein each object time stamp and the child time stamp for a first folder is initially set to one or more first time stamp values;
upon a refresh, receive directory contents information from the remote file server identifying the objects in the first folder corresponding to objects on the remote file server;
add new objects of the first folder to the local cache;
set objects identified in the first folder as corresponding to objects on the remote file server with a second time stamp value;
defer deletion of invalidated objects in the first folder until a client application issues a command identifying the first folder by maintaining the first time stamp values for deleted objects in the first folder; and
delete, responsive to a subsequent directory contents access request from a client application that identifies the first folder, objects in the first folder on the local cache having time stamps older than the child time stamp of the first folder.

2. The apparatus of claim 1 further comprising computer-readable instructions operative to cause the one or more processors to set time stamps for newly created files or folders.

3. The apparatus of claim 1 further comprising computer-readable instructions operative to cause the one or more processors to set a time stamp for an object moved to the first folder to the value of the child time stamp of the first folder.

4. A method comprising
maintaining, in a local cache in a local memory, a cached version of directory contents information of a remote file server, the directory contents information including an object time stamp for each file and a child time stamp for each folder, wherein each object time stamp and the child time stamp for a folder is initially set to one or more first time stamp values;
upon a refresh, receiving directory contents information from the remote file server identifying the objects in the folder corresponding to objects on the remote file server;
adding new objects of the first folder identified in the received directory content information to the local cache;
setting objects identified in the first folder as corresponding to objects on the remote file server with a second time stamp value;
deferring deletion of invalidated objects in the first folder until a client application issues a command identifying the first folder by maintaining the first time stamp values for deleted objects in the first folder; and
deleting, responsive to a subsequent directory contents access request from a client application that identifies the first folder, objects in the first folder on the local cache having time stamps older than the child time stamp of the first folder.

5. The method of claim 4 further comprising setting time stamps for newly created files or folders.

6. The method of claim 4 further comprising setting a time stamp for a file or folder moved to the first folder to the value of the child time stamp of the first folder.

7. An apparatus comprising
one or more network interfaces;
a memory;
one or more processors;
computer-readable instructions stored in the memory operable to cause the one or more processors to:
maintain, in a local cache, a cached version of directory contents information of a remote file server; wherein the directory contents information comprises access control information for one or more files and folders;
in a full directory refresh mode,
request directory contents information of a first folder from the remote file server including access control information;
synchronize the directory contents information received from the remote file server, including the access control information, with the local cache;
in a partial directory refresh mode,
request directory contents information of a first folder from the remote file server excluding access control information;
synchronize the directory contents information received from the remote file server with the local cache; and
determine whether to enter the partial directory refresh mode or a full directory refresh mode for a given file folder:
in response to a request from a client application for an object within the given file folder; and
based at least upon a plurality of requests since a last full directory refresh for the given file folder.

8. A method comprising
maintaining, in a local cache in a local memory, a cached version of directory contents information of a remote file server; wherein the directory contents information comprises, for one or more files or folders, a first set of information and a second set of information, wherein the second set of information changes less frequently than the first set of information;
in a full directory refresh mode,
requesting directory contents information of a first folder from the remote file server including the first and second sets of information; and
synchronizing the directory contents information received from the remote file server, including the first and second sets of information, with the local cache;
in a partial directory refresh mode,
requesting directory contents information of the first folder from the remote file server including the first set of information and excluding the second set of information; and
synchronizing the directory contents information including the first set of information received from the remote file server with the local cache; and
determining whether to enter the partial directory refresh mode or a full directory refresh mode for a given file folder:
in response to a request from a client application for an object within the given file folder; and
conditioned at least upon a plurality of requests since a last full directory refresh for the given file folder.

9. The method of claim 8 wherein the second set of information comprises security attribute information.

10. The method of claim 8 wherein the entering the partial or full directory refresh mode is further conditioned on whether the directory contents information of the first folder has not been refreshed in the cache has been refreshed within a threshold period of time.

11. The method of claim 8 wherein the entering the partial or full directory refresh mode comprises
entering the partial directory refresh mode if the directory contents information of the first folder has not been refreshed in the cache for a first threshold period of time;
entering the full directory refresh mode, if the directory contents information of the first folder has not been refreshed in the cache for a second threshold period of time.

12. The method of claim 11 wherein the second threshold period of time is greater than the first threshold period of time.

13. The method of claim 8 further comprising entering the full directory refresh mode for the given file folder based upon a determination that a plurality of requests for the given file folder have been received since the last full directory refresh for the given file folder.

* * * * *